July 15, 1924.
H. A. GOLLOBIN
REMOVABLE BRIDGE FOR TEETH
Filed June 16, 1922
1,501,540
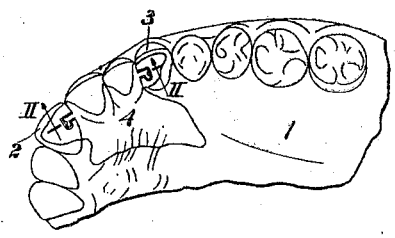
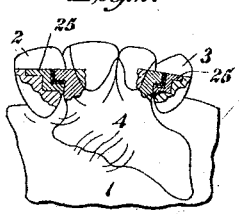
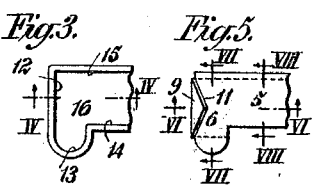
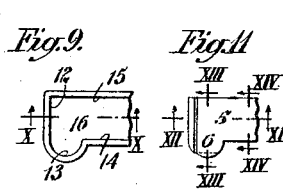
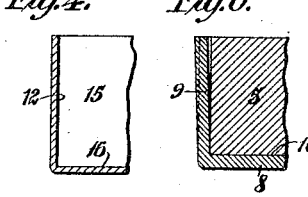
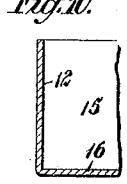
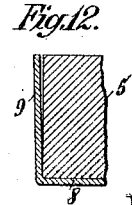
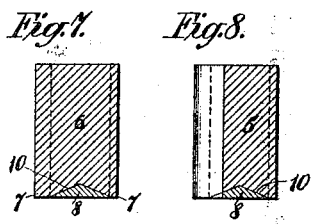
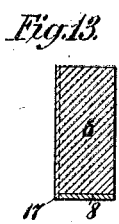
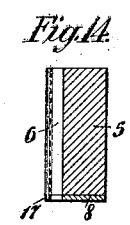
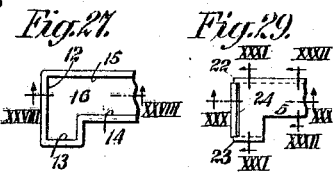
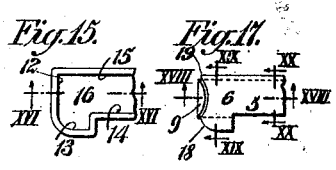
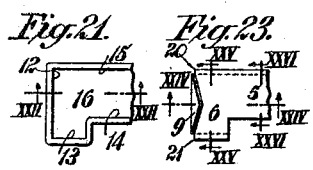
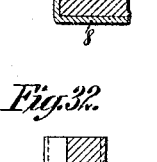
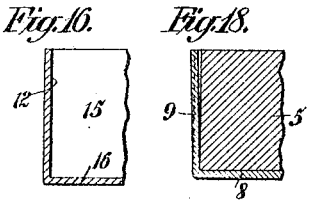
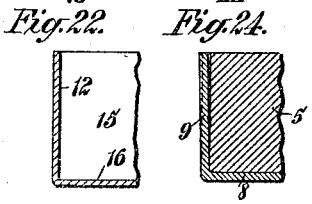
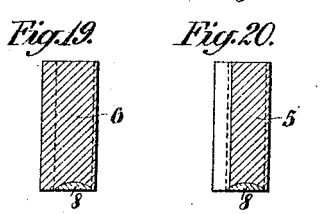
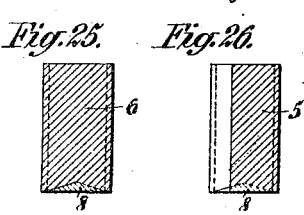

Patented July 15, 1924.

1,501,540

UNITED STATES PATENT OFFICE.

HARRY A. GOLLOBIN, OF NEW YORK, N. Y.

REMOVABLE BRIDGE FOR TEETH.

Application filed June 16, 1922. Serial No. 568,752.

*To all whom it may concern:*

Be it known that I, HARRY A. GOLLOBIN, a citizen of the United States, and resident of the borough of Bronx, in the city and State of New York, have invented a new and useful Improvement in Removable Bridges for Teeth (Case B), of which the following is a specification.

This invention relates to certain improvements in bridges for teeth and has more particularly for its object to provide novel means for attaching removable bridges to abutments in the mouth in such a manner that the bridges will be held very rigidly by frictional engagement with the said abutments.

This invention furthermore relates to certain improvements in the construction, form and co-relation of the frictional coacting bridge and abutment members of the attachment for removably securing the bridge in the mouth.

Practical embodiments of my invention are represented in the accompanying drawings, in which—

Fig. 1 represents in plan the removable bridge located in proper position in the mouth.

Fig. 2 represents a detail section on line II—II of Fig. 1.

Fig. 3 represents a plan of the first form of abutment member.

Fig. 4 represents a section on line IV—IV of Fig. 3.

Fig. 5 represents a plan of the corresponding bridge member.

Figs. 6, 7 and 8 represent sections on lines VI—VI, VII—VII and VIII—VIII respectively of Fig. 5.

Fig. 9 represents a plan of a second form of abutment member.

Fig. 10 represents a section on line X—X of Fig. 9.

Fig. 11 represents a plan of the corresponding bridge member.

Figs. 12, 13 and 14 represent sections on lines XII—XII, XIII—XIII and XIV—XIV of Fig. 11.

Fig. 15 represents a plan of a third form of abutment member.

Fig. 16 represents a section on line XVI—XVI of Fig. 15.

Fig. 17 represents a plan of the corresponding bridge member.

Figs. 18, 19 and 20 represent sections on lines XVIII—XVIII, XIX—XIX and XX—XX of Fig. 17.

Fig. 21 represents a plan of a fourth form of abutment member.

Fig. 22 represents a section on line XXII—XXII of Fig. 21.

Fig. 23 represents a plan of the corresponding bridge member.

Figs. 24, 25 and 26 represent sections on lines XXIV—XXIV, XXV—XXV and XXVI—XXVI of Fig. 23.

Fig. 27 represents a plan of a fifth form of abutment member.

Fig. 28 represents a section on line XXVIII—XXVIII of Fig. 27.

Fig. 29 represents a top plan view of the corresponding bridge member.

Figs. 30, 31 and 32 represent sections on lines XXX—XXX, XXXI—XXXI and XXXII—XXXII of Fig. 29.

The portion of the mouth represented in the drawing is denoted by 1 and the teeth which form the abutments for the bridge are denoted by 2 and 3. The bridge of teeth for filling the space between the abutment teeth is denoted by 4.

In the present instance I have shown like means for removably attaching both ends of the bridge to the abutment teeth.

In all of the forms illustrated the shank 5 of the bridge member is of the desired height, length and thickness and it is provided with an L-shaped head 6. The separate L-shaped spring has its horizontal branch 8 permanently united to the bridge member along the bottom of the shank 5 and head 6, the free vertical branch 9 of which spring extends along the outer face of the head from bottom to top thereof, the said free vertical branch being slightly separated from the head to permit the spring to be forced toward the head when the bridge member is inserted into the corresponding recess in the abutment member to be hereinafter described.

In the first form of attachment illustrated in Figs. 1 to 8 inclusive the head 6 has its projecting side rounded from top to bottom as shown at 7. In this form also, both the horizontal and vertical branches of the spring are triangular in cross section and the bottom of the shank and head is provided with a groove 10 for receiving the bottom branch of the spring, and the outer face of the head is provided with a groove 11 forming a seat for the free vertical branch of the spring when the said vertical branch is forced inwardly against the head by the insertion of the head into the recess in the abutment member. In the form under discussion the abutment member comprises a vertical back wall 12, a curved side wall 13 terminating in a straight side wall 14; an opposite side wall 15 and a bottom wall 16 forming a recess shaped to snugly fit the head of the bridge member.

In the form of attachment shown in Figs. 9 to 14 inclusive, the bottom and vertical branches of the L-shaped spring are substantially rectangular in cross section, the free vertical branch of the spring extending across the entire outer face of the head of the bridge member, one of the front side corners of the vertical branch of the spring being rounded to form a continuation of the curved side of the L-shaped head when the spring is forced rearwardly into engagement with the outer face of the head. In this form there are no grooves provided along the bottom and outer face of the bridge member for receiving the spring, the bottom horizontal branch of the spring being permanently united to the bottom of the shank and head; only the portion of the projecting side of the head which extends beyond the corresponding side of the spring being extended downwardly a short distance, as shown at 17, to a point flush with the bottom of the horizontal branch of the spring. In the form under discussion, the abutment member has its recess shaped to snugly fit the head of the bridge member.

In the form of attachment illustrated in Figs. 15 to 20 inclusive, the projecting side of the head of the bridge member is provided with a curved outer edge 18 and a sharp inner edge 19 extending from top to bottom thereof. In this form the inner walls of the horizontal and vertical branches of the spring are convex and the grooves along the bottom and outer faces of the bridge member are concave to correspond therewith. In the form under discussion the abutment member has its recess shaped to correspond with the head of the bridge member.

In the form of attachment illustrated in Figs. 21 to 26 inclusive, the projecting side of the head of the bridge member is shown as having square corners 20, 21 along its front and back edges from top to bottom thereof, the inner walls of the horizontal and vertical branches of the spring being shaped in this form substantially like the form shown in Figs. 1 to 8 inclusive. In the form under discussion the abutment member has its recess shaped to snugly fit the head of the bridge member.

In the form illustrated in Figs. 27 to 32 inclusive, the projecting side of the head of the bridge member has square corners 22, 23, along its front and back edges from top to bottom thereof as in the preceding form just described, but in this last form the horizontal and vertical branches of the spring are rectangular in cross section and the outer face of the head is provided with a rectangular groove 24 for receiving the free vertical branch of the spring. In the form under discussion the abutment member has its recess shaped to correspond with the head of the bridge member.

The inlays for securing the abutment members to their respective teeth are denoted by 25, the shape and size of the abutment members being such that the vital portions of live teeth, when used as abutment teeth, may be saved in the cutting of the teeth to properly secure the abutment members in position.

It will be understood that the embodiments illustrated are only a few of the numerous forms in which the bridge and abutment members could be made to suit various requirements but in all of these forms the head of the bridge member is not weakened by kerfs as heretofore, the frictional grip between the bridge and abutment members in the present improvement being provided for by a separate spring permanently united to the bridge member. This arrangement permits the head member and spring to be made of different metals, thus allowing the head member to be made of a hard, strong and rigid metal and the spring to be made of a spring metal, thereby adding great strength to the attachment.

Furthermore, it will be seen that the head may be made of any desired width and the spring may be made of any desired width, thus rendering the attachment applicable for many different conditions. The provisions of a separate spring also enables the free vertical branch of the spring to be adjustable to the minutest degree, to obtain the required frictional engagement between the bridge and the abutment members. The provision of a bottom wall for the abutment member also provides a better and more rigid support for the bridge member. It will also be observed that all strain is removed from the spring, the strain being taken by the head of the bridge member, which has not been weakened by dividing the same to form friction surfaces as heretofore commonly done.

What I claim is:

1. A removable bridge attachment including coacting bridge and abutment members, the bridge member having an L-head, and a separate L-shaped friction spring having its horizontal branch permanently united to the bottom of the bridge member and its free vertical branch extending along the outer face of the head, the head having a groove along its outer face for permitting the free vertical branch of the spring to be forced thereinto.

2. A removable bridge attachment including coacting bridge and abutment members, the bridge member having an L-head, and a separate L-shaped spring, the bottom of the bridge member having a groove for receiving and permanently holding the horizontal branch of the spring, the free vertical branch of the spring extending along the outer face of the head.

3. A removable bridge attachment including coacting bridge and abutment members, the bridge member having an L-head, and a separate L-shaped friction spring, the bottom of the bridge member having a groove for receiving and permanently holding the horizontal branch of the spring, the outer face of the head having a groove for permitting the free vertical branch of the spring to be forced thereinto.

In testimony that I claim the foregoing as my invention, I have signed my name this fourteenth day of June 1922.

HARRY A. GOLLOBIN.